(12) United States Patent
Garau

(10) Patent No.: US 8,091,248 B2
(45) Date of Patent: Jan. 10, 2012

(54) COORDINATE MEASURING MACHINE

(75) Inventor: Enrico Garau, Turin (IT)

(73) Assignee: Hexagon Metrology S.p.A., Moncalieri (IT)

( * ) Notice: Subject to any disclaimer, the term of this patent is extended or adjusted under 35 U.S.C. 154(b) by 306 days.

(21) Appl. No.: 12/296,071

(22) PCT Filed: Apr. 6, 2006

(86) PCT No.: PCT/IT2006/000231
§ 371 (c)(1),
(2), (4) Date: Apr. 21, 2009

(87) PCT Pub. No.: WO2007/113880
PCT Pub. Date: Oct. 11, 2007

(65) Prior Publication Data
US 2009/0217540 A1 Sep. 3, 2009

(51) Int. Cl.
*G01B 5/008* (2006.01)
*G01B 5/02* (2006.01)

(52) U.S. Cl. ........................................... 33/503; 33/832

(58) Field of Classification Search ................... 33/1 M, 33/503, 556, 557, 558, 832, 833
See application file for complete search history.

(56) References Cited

U.S. PATENT DOCUMENTS

| | | | |
|---|---|---|---|
| 4,133,112 A * | 1/1979 | Matthiessen | 33/1 M |
| 4,594,791 A | 6/1986 | Brandstetter | |
| 4,630,381 A * | 12/1986 | Sakata et al. | 33/503 |
| 4,882,847 A | 11/1989 | Hemmelgarn et al. | |
| 5,035,503 A | 7/1991 | Sadeh et al. | |
| 5,042,162 A | 8/1991 | Helms | |
| 5,621,978 A | 4/1997 | Sarauer | |
| 6,049,988 A * | 4/2000 | Shirai | 33/1 M |
| 6,408,530 B1 * | 6/2002 | Matzkovits et al. | 33/503 |
| 6,647,632 B2 * | 11/2003 | Tominaga et al. | 33/1 M |
| 7,343,684 B2 * | 3/2008 | Carlisle | 33/1 M |

FOREIGN PATENT DOCUMENTS

| | | | |
|---|---|---|---|
| DE | 4026990 A1 | 2/1992 | |
| WO | WO 9116594 A1 * | 10/1991 | |

* cited by examiner

*Primary Examiner* — Richard A. Smith
(74) *Attorney, Agent, or Firm* — Orrick Herrington & Sutcliffe, LLP

(57) ABSTRACT

A coordinate measuring machine (1) comprising a base (2) provided with guides (3) parallel ● to a first axis X, a first carriage (4) mobile on the guides (3) along the axis X and provided with an upright (17), a second carriage (6) carried by the upright (17) and mobile along a second vertical axis Z, and a horizontal arm (7) carried by the second carriage (6) and mobile along a third horizontal axis Y perpendicular to the axis X; the guides (3) of the first carriage (4) are arranged underneath a top wall (12) of the base (2), which is therefore flat and treadable.

10 Claims, 3 Drawing Sheets

COORDINATE MEASURING MACHINE

TECHNICAL FIELD

The present invention relates to a coordinate measuring machine, particularly of the horizontal arm type.

BACKGROUND ART

Coordinate measuring machines of the aforesaid type are known, comprising a base provided with guides along which a first horizontal axis X, a first carriage mobile on the base along the axis X and comprising an upright provided with guides extending along a second vertical axis, a second carriage carried by the upright and sliding on the same along axis Z, and an arm carried by the second carriage and extending along a third horizontal axis Y orthogonal to the axis X. One end of the arm is adapted to carry a contact or optical detector for measuring the dimensional features of parts.

In the known machines of the type briefly described, the guides of the first carriage along the axis X are normally arranged on an upper surface of the base, and the first carriage is provided with runners sliding on the guides.

The upper surface of the base therefore presents a discontinuity due to the aforesaid guides.

Furthermore, the guides must be adequately protected to prevent dirt from depositing on the same, or foreign bodies from reaching the guides and interacting with the runners of the first carriage.

The known protection systems generally consist of a flexible ribbon arranged so as to cover the guides. The ribbon is lifted by the first carriage as it transits, by means of diverting members, allowing the runners of the first carriage to slide on the guides. This system, however widely used, is complex and costly. Furthermore, the ribbon does not constitute a rigid, treadable surface and may be damaged.

Finally, the structure itself of the base is complex and costly.

DISCLOSURE OF INVENTION

It is the object of the present invention to make a coordinate measuring machine which allows to solve the problems related to the known machines specified above.

This object is achieved by a measuring machine according to claim 1.

BRIEF DESCRIPTION OF THE DRAWINGS

For a better understanding of the present invention, it will now be described a preferred embodiment by way of non-limitative example, and with reference to the accompanying drawings, in which.

BEST MODE FOR CARRYING OUT THE INVENTION

Figure 1:
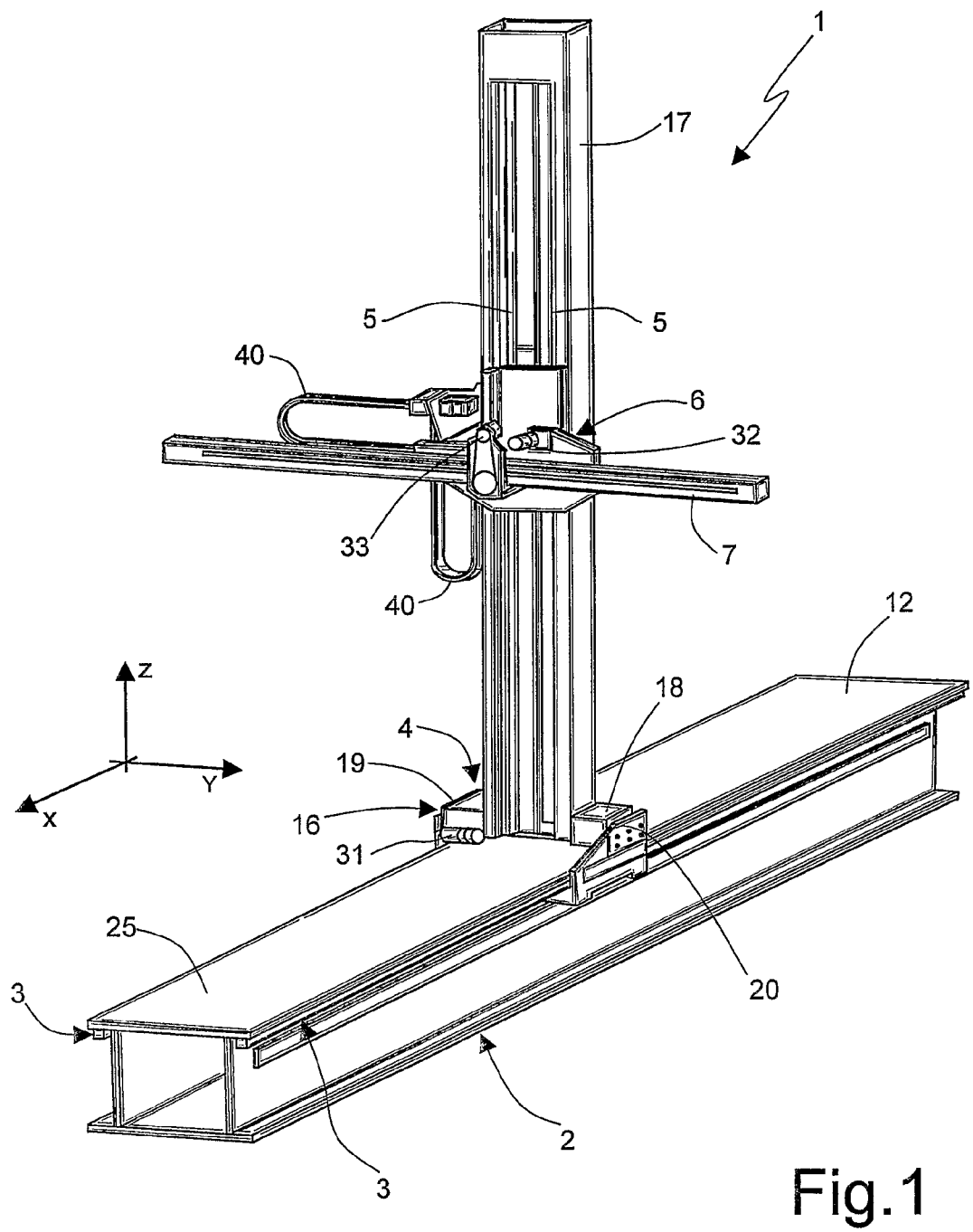
FIG. 1 is a perspective view of a horizontal arm coordinate measuring machine, in position of use.

In FIG. 1, it is indicated as a whole by 1 a horizontal arm coordinate measuring machine.

Machine 1 essentially comprises a base 2 provided with guides 3 along a horizontal axis X, a first carriage 4 mobile on the base 2 along the axis X and provided with guides 5 extending along a vertical axis Z, a second carriage 6 carried by the first carriage 4 and sliding along the axis Z, and a horizontal arm 7 carried by the second carriage 6, extending along an axis Y orthogonal to the axis X and axially mobile along the axis Y. One end of the arm 7 is adapted to carry a contact or optical detector (not shown) for measuring the dimensional features of parts.

Figure 3:
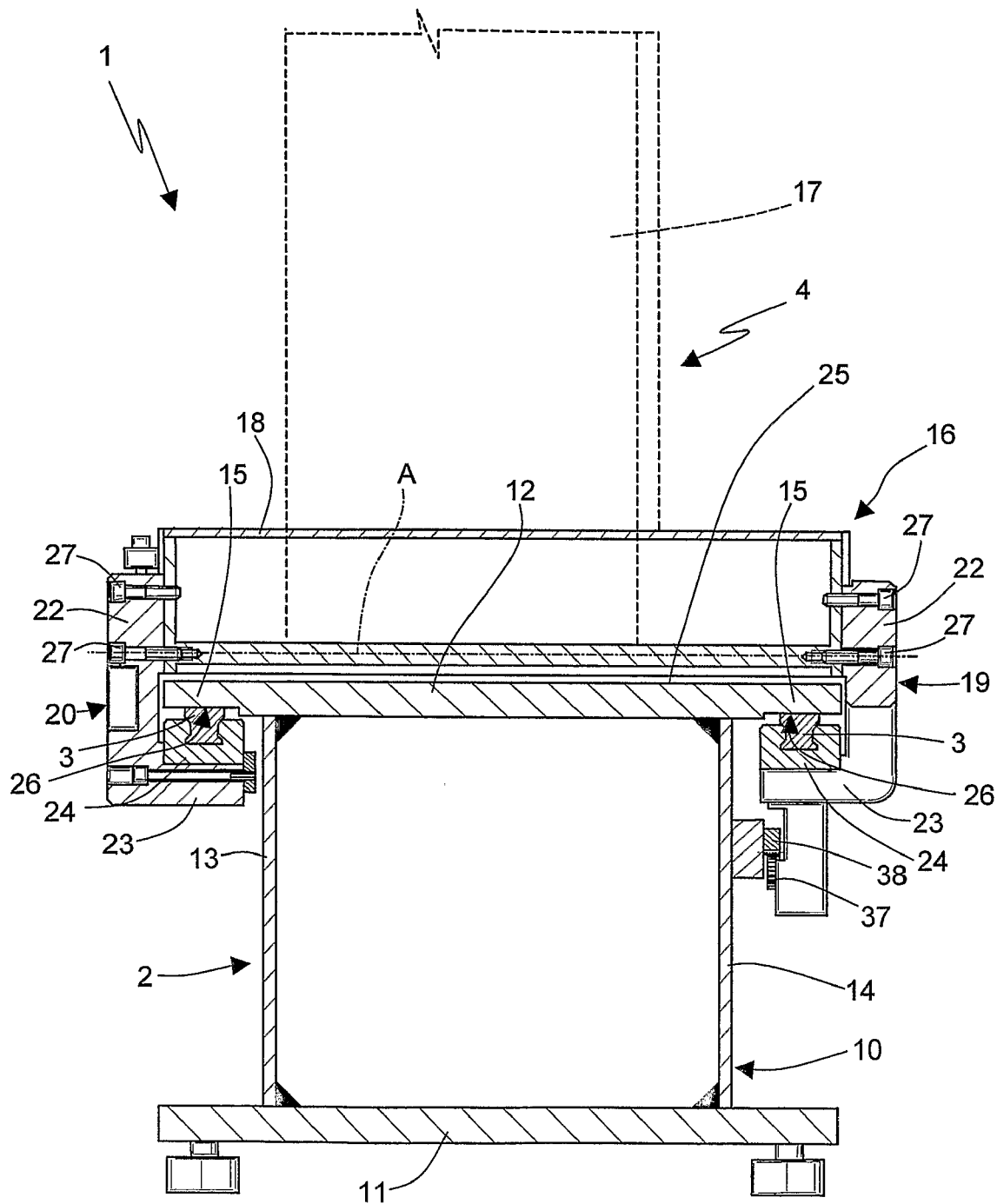
FIG. 3 is a section taken along line III-III in FIG. 3.

More specifically, base 2 (FIG. 3) essentially consists of a box-type structure 10 elongated in the direction of the axis X, with constant section, having a flat horizontal bottom wall 11 and top wall 12, and a pair of vertical, reciprocally parallel side walls 13, 14. The side walls 13, 14 are reciprocally spaced at a distance smaller than the width of the walls 11, 12 so that the latter laterally protrude from the side walls 13, 14 with respective side wings 15.

The sliding guides 3 of the first carriage 4 along the axis X are fixed under the side wings 15 of the top wall 12, which therefore presents a flat treadable upper surface 25, being also free from guides and delicate components, such as, for example, protection ribbons for the guides. The bottom of the wings 15 of the top wall 12 are machined so as to define respective resting surfaces 26 of the guides 3; for the rest, the wall 12, as well as all the walls 11, 13 and 14 may be relatively rough, thus considerably reducing the manufacturing costs of the base 2.

The first carriage 4 comprises a lower base 16 mobile on the guides 3 and an upright 17 having a vertical axis tubular structure which extends upwards from the base 16 and carries the guides 5 of carriage 6.

More precisely (FIG. 4), the base 16 consists of a central body 18 rigidly fastened to the upright 17 and a pair of side shoulders 19, 20 fixed to opposite sides of the central body 18 and each sliding along a respective guide.

Each of the shoulders presents an essentially L-shaped section, with a vertical plate portion 22 adapted to be fastened to the central body 18 and a lower horizontal portion 23 extending underneath the respective wing 15.

Ball circulation runners 24 cooperating with the respective guides 3 are fastened on portions 23, conveniently having I-section and provided with inclined surfaces defining an "O"-type contact pattern, in the example shown, with the balls. According to possible alternatives, an "X"-type contact pattern may be used or the runners 24 may be of the pneumostatic type.

Conveniently, shoulder 20 presents longer extension along the axis X and is provided with two runners 24; a single runner is carried by shoulder 19. In this way, on guides 3 there are defined three rests in total, and therefore an isostatic constraint system by means of which carriage 4 is suspended from the guides 3. Such system is essentially rigid according to all degrees of freedom, except for translation along the axis X.

The plate portions 22 of the shoulders 19, 20 are fastened to the central body by means of a plurality of screws 27.

Figure 2:
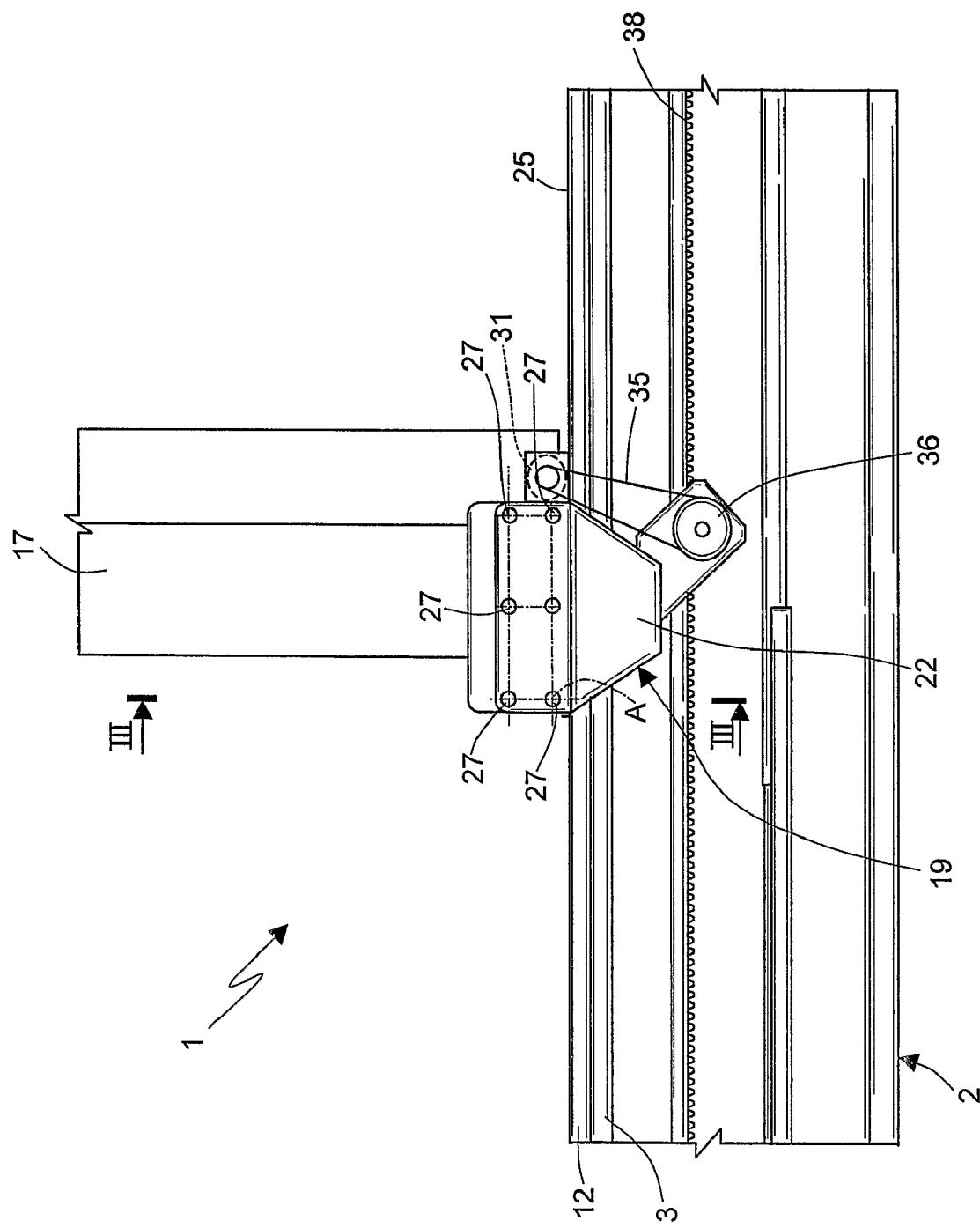
FIG. 2 is a side view, in magnified scale, of a detail of the machine in FIG. 1.

The mobile parts of the machine are moved, in a way per se known, by means of rack and pinion devices driven by respective electric motors 31, 32, 33. In particular, the first carriage 4 is actuated by an electric motor 31 carried by the shoulder 19 (FIG. 2), which provides motion via a belt 35 to a pulley 36 integral with a pinion 37 (FIG. 3) which meshes with a rack 38 fastened on the side wall 14 of the base 2 in a direction parallel to the axis X. The actuating devices of second carriage 6 and of arm 7 are similar and are not described in detail.

The connection of the electric motors 31, 32, 33 to the respective power and control system (not shown) is achieved by means of wirings (not shown) which are accommodated in articulated chains 40 in the transition zones between relatively moving parts.

From an examination of the features of the machine 1 made according to the present invention there are apparent the advantages that it allows to obtain.

According to the present invention, the top wall 12 of the base 2 is flat and defines a continuous, treadable upper surface 25. Since the guides 3 are arranged underneath the top wall 12, no particular protections are required and there is no risk of accumulation of dirt or presence of undesired bodies on the guides.

The base itself is particularly simple and cost-effective to manufacture, in that the geometry of the top wall is simple and its surface finish, except for the resting surfaces 26, may be relatively rough.

It is finally apparent that changes and variations may be implemented to the described machine 1 without however departing from the scope of protection defined by the claims. In particular, the measuring volume of the machine may be considerably expanded in the direction of axis X by joining several bases of the described type.

The invention claimed is:

1. A coordinate measuring machine comprising a base provided with first guiding means along a first horizontal axis, a first carriage mobile on the base along said first axis and provided with second guiding means extending along a second axis orthogonal to the first axis, a second carriage carried by the first carriage and sliding along said second axis, and an arm carried by the second carriage extending along a third axis orthogonal to the first and to the second axis and mobile along said third axis, the base having a lower structure and a top wall forming two wings protruding laterally from the lower structure, wherein said first guiding means comprises two guides fastened to and underneath the respective wings, said top wall having an upper surface that is free from guides.

2. A machine according to claim 1, wherein said top wall of said base is treadable.

3. A machine according to claim 1, wherein said upper surface of said top wall of said base is flat.

4. A machine according to claim 1, wherein said upper surface of said top wall of said base is unfinished.

5. A machine according to claim 1, wherein said base comprises a constant section box-type structure comprising a bottom wall, a pair of side walls and said top wall, said wings of said top wall laterally protruding beyond respective said side walls.

6. A machine according to claim 5, wherein said first carriage is provided with ball circulation runners coupled to said guides.

7. A machine according to claim 6, wherein said runners define with said guides an isostatic constraint system by means of which said first carriage is suspended from said guides.

8. A machine according to claim 7, wherein said constraint system of said first carriage is substantially rigid except for translation along said first axis.

9. A coordinate measuring machine comprising:
a base having a lower structure and a top wall with two wings protruding laterally from the lower structure and further comprising a first set of two guides one fastened underneath each of the respective wings along a first horizontal axis,
the top wall of the base having an upper surface that is free from guides,
wherein the base comprises a constant section box-type structure comprising a bottom wall, a pair of side walls and the top wall, the wings of the top wall laterally protruding beyond the respective side walls,
a first carriage mobile on the base along the first axis and provided with a second guide extending along a second axis orthogonal to the first axis,
a second carriage carried by the first carriage and slidable along the second axis,
an arm carried by the second carriage extending along a third axis orthogonal to the first and second axes and mobile along the third axis, and
wherein the first set of guides defines an isostatic constraint system that suspends the first carriage from the first set of guides.

10. A machine according to claim 9, wherein the constraint system of the first carriage is substantially rigid except for translation along the first axis.

* * * * *